(12) United States Patent
Richardson

(10) Patent No.: US 11,314,873 B2
(45) Date of Patent: Apr. 26, 2022

(54) STORAGE SYSTEM

(71) Applicant: HAVENTEC PTY LTD, Sydney (AU)

(72) Inventor: Ric B. Richardson, Suffolk Park (AU)

(73) Assignee: HAVENTEC PTY LTD, Sydney (AU)

(*) Notice: Subject to any disclaimer, the term of this patent is extended or adjusted under 35 U.S.C. 154(b) by 232 days.

(21) Appl. No.: 16/066,029

(22) PCT Filed: Jan. 3, 2017

(86) PCT No.: PCT/AU2017/000002
§ 371 (c)(1),
(2) Date: Jun. 25, 2018

(87) PCT Pub. No.: WO2017/106938
PCT Pub. Date: Jun. 29, 2017

(65) Prior Publication Data
US 2019/0012467 A1   Jan. 10, 2019

(51) Int. Cl.
*G06F 21/60* (2013.01)
*H04L 29/06* (2006.01)
(Continued)

(52) U.S. Cl.
CPC .......... *G06F 21/602* (2013.01); *G06F 21/575* (2013.01); *H04L 9/0861* (2013.01);
(Continued)

(58) Field of Classification Search
CPC ... H04L 9/0861; H04L 9/0891; H04L 9/0894; H04L 67/42; H04L 67/02; H04L 67/025;
(Continued)

(56) References Cited

U.S. PATENT DOCUMENTS 6,601,170 B1    7/2003   Wallace, Jr.
7,519,810 B2    4/2009   Blew et al.
(Continued)

FOREIGN PATENT DOCUMENTS

| CN | 1486014 A | 3/2004 |
|---|---|---|
| WO | 2013/020177 A1 | 2/2013 |
| WO | 2013/020178 A1 | 2/2013 |

OTHER PUBLICATIONS

International Search Report (ISR) and Written Opinion (WO) dated Mar. 28, 2017 for International Application No. PCT/AU2017/000002.
(Continued)

*Primary Examiner* — Jung W Kim
*Assistant Examiner* — Sangseok Park
(74) *Attorney, Agent, or Firm* — Ladas & Parry LLP

(57) ABSTRACT

In a client server environment a method of securely storing data; said method comprising
generating a data element at a second location; transmitting the data element to a first location
separate and remote from the second location; encrypting the data element at the first location thereby to form an encrypted data element;
transmitting the encrypted data element to the second location separate and remote from the first location and storing the encrypted data element at the second location; and wherein the second location is constituted as a client device.
Also disclosed in a client server environment an apparatus for secure storage of data; said apparatus comprising a first processor at a first location which encrypts data utilising a key; said apparatus further comprising a second processor located at a second location remote from the first location; the data, after encryption, moved over a network to the second processor and stored in association with the second
(Continued)

Figure 1:
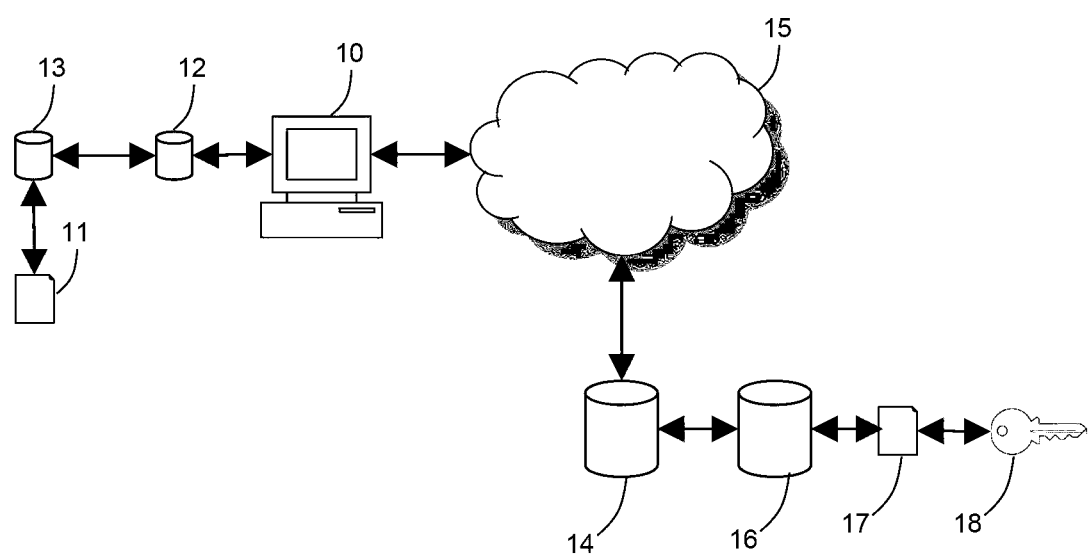

processor until the data is required for execution of an application on the first processor at which time the data is moved back from the second processor to the first processor and the first processor applies the key to a decryption algorithm to decrypt the data for use by the application executing on the first processor.

In preferred forms the second location/second processor are constituted by a client device.

12 Claims, 23 Drawing Sheets

(51) Int. Cl.
  *G06F 21/57*    (2013.01)
  *H04W 12/06*    (2021.01)
  *H04L 9/08*     (2006.01)
  *H04L 67/01*    (2022.01)

(52) U.S. Cl.
  CPC .......... *H04L 9/0891* (2013.01); *H04L 9/0894* (2013.01); *H04L 63/0428* (2013.01); *H04W 12/068* (2021.01); *H04L 67/42* (2013.01); *H04L 2209/76* (2013.01)

(58) Field of Classification Search
  CPC ... G06F 21/602; G06F 21/71; G06F 2209/541
  See application file for complete search history.

(56) References Cited

U.S. PATENT DOCUMENTS

| | | |
|---|---|---|
| 2002/0004784 A1 | 1/2002 | Forbes et al. |
| 2007/0198823 A1 | 8/2007 | Blew et al. |
| 2007/0288743 A1 | 12/2007 | Cam-Winget et al. |
| 2008/0091955 A1* | 4/2008 | Leach ...................... H04L 9/06 713/193 |
| 2010/0208889 A1 | 8/2010 | Humphrey et al. |
| 2011/0307383 A1 | 12/2011 | Ratica |
| 2012/0017095 A1 | 1/2012 | Blenkhorn et al. |
| 2014/0122866 A1 | 5/2014 | Haeger et al. |
| 2014/0344164 A1 | 11/2014 | Pauker et al. |
| 2015/0006890 A1 | 1/2015 | Roth et al. |
| 2015/0143112 A1 | 5/2015 | Yavuz et al. |
| 2016/0050188 A1* | 2/2016 | Wilson ............... G06Q 30/0269 713/171 |
| 2016/0286005 A1* | 9/2016 | Bruce ...................... G06F 9/54 |

OTHER PUBLICATIONS

International Preliminary Report on Patentability (IPRP) dated Apr. 20, 2018 for Application No. PCT/AU2017/000002.
Supplementary European Search Report (SESR) dated May 7, 2019 for Application No. EP 17732010.8.
Written Opinion dated Feb. 10, 2019 and a Search Report dated Jan. 10, 2019 for Singapore Application No. 11201806423Q.
Espacenet English abstract of CN 1486014 A.

* cited by examiner

Unsecured Window Period

Secured Window Period

Subsequent Unsecured Window Period

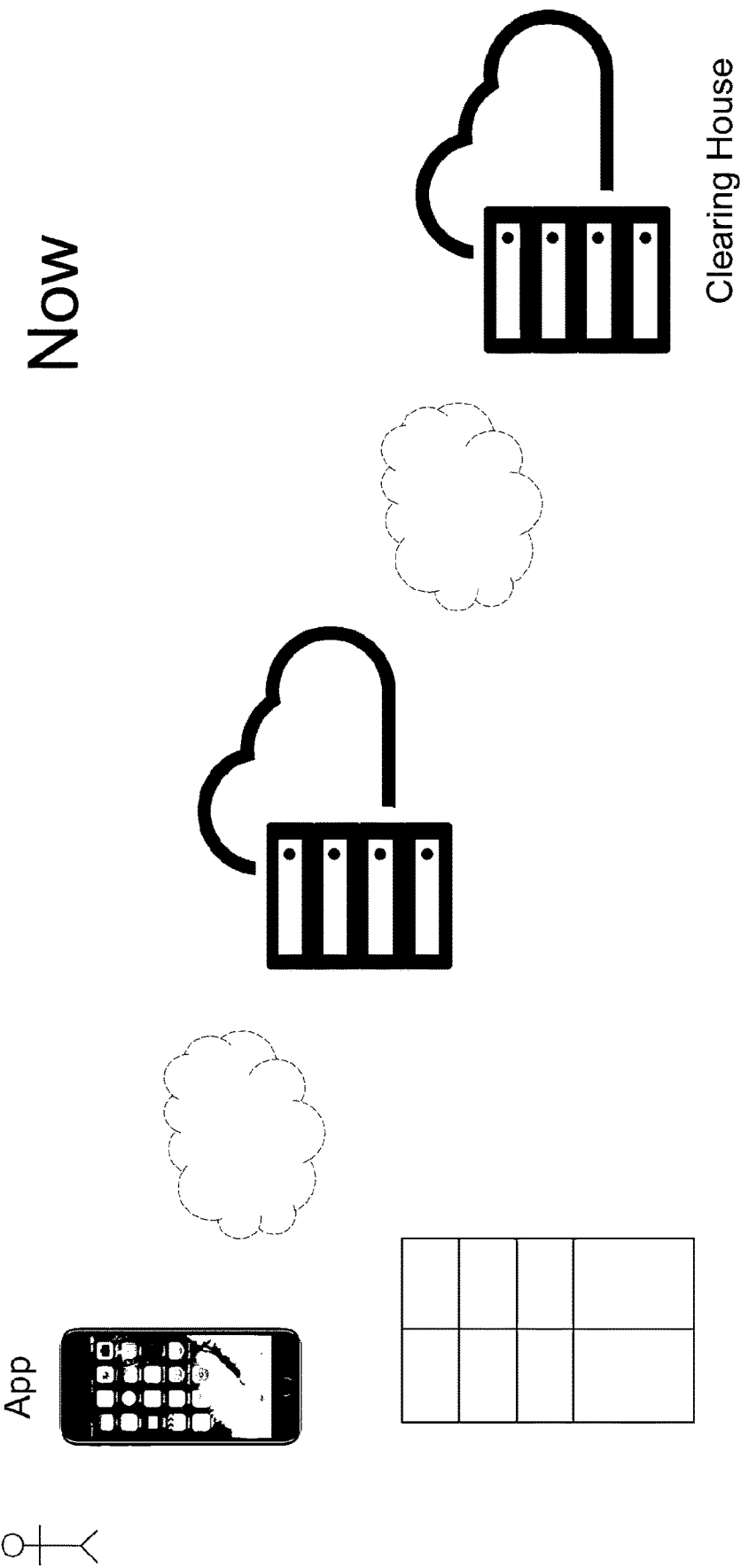

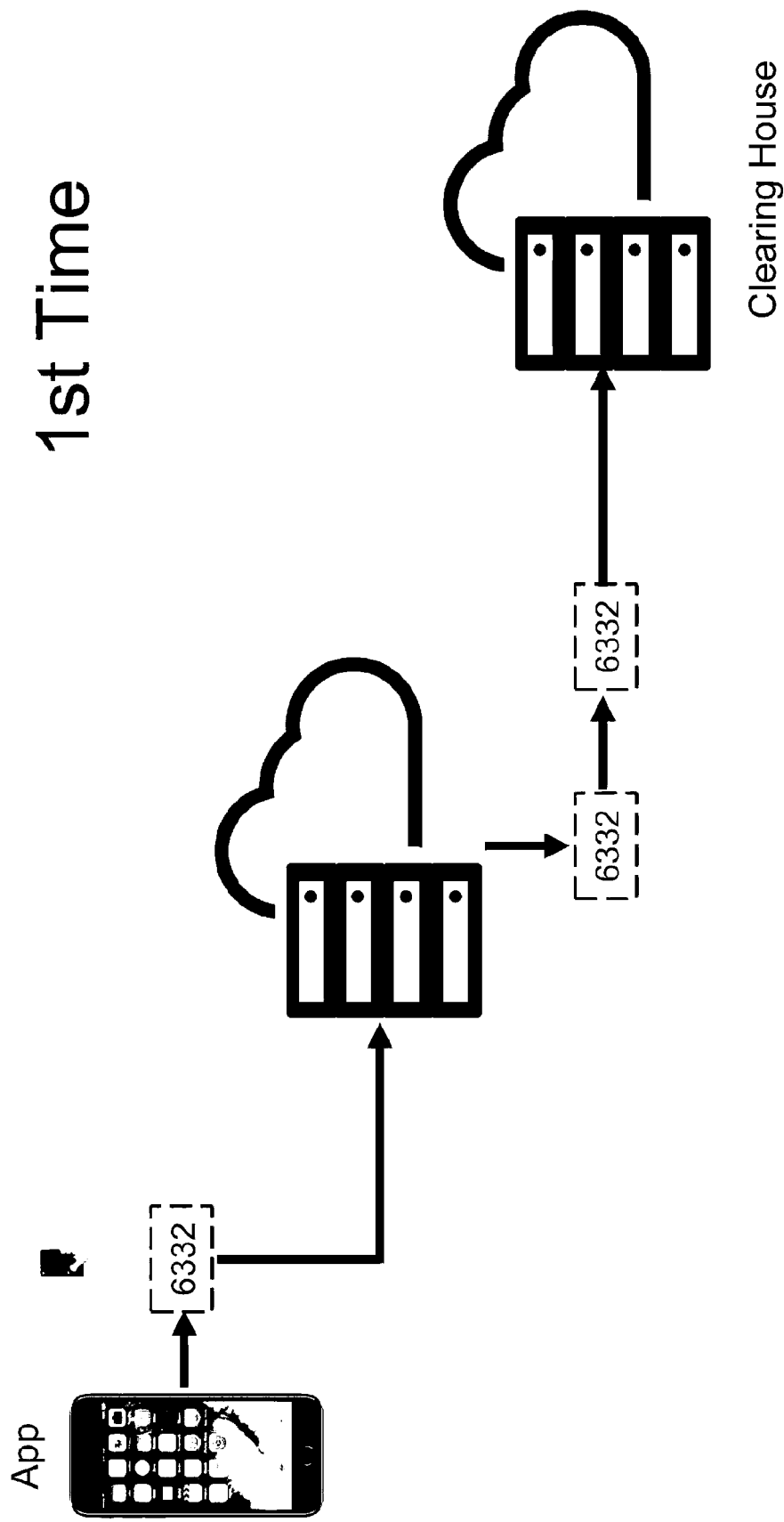

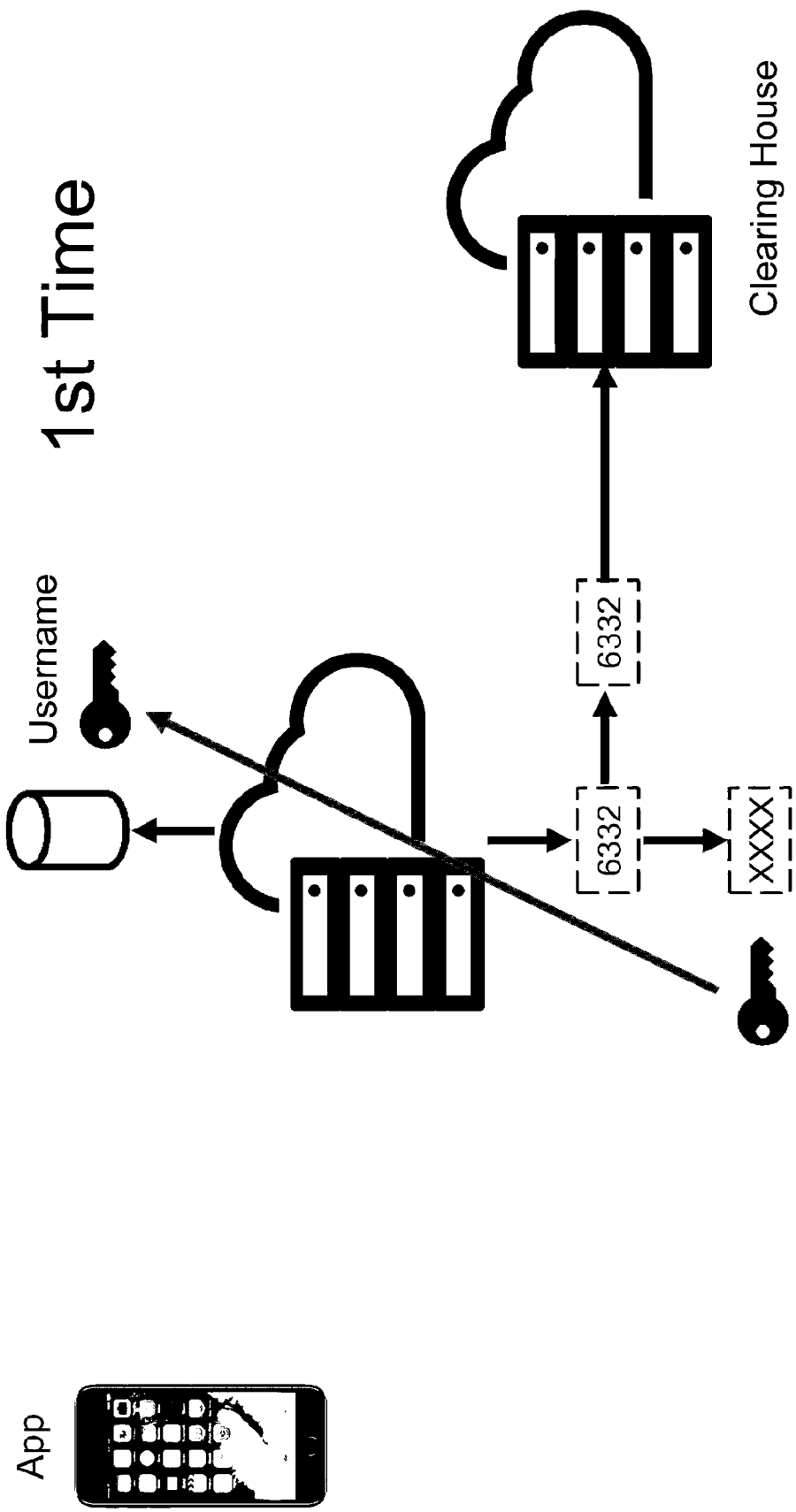

Clearing House iPhone Keychain

STORAGE SYSTEM

RELATED APPLICATION

This application is an application under 35 U.S.C. 371 of International Application No. PCT/AU2017/000002 filed on Jan. 3, 2017, the entire contents of which are incorporated herein by reference.

TECHNICAL FIELD

The present invention relates to the storage of data on electronic networks and, more particularly although not exclusively, to the secure storage of data which is accessible across an electronic network.

BACKGROUND

A common practice is to secure sensitive or secure data on a centralised server is a common practice in the art. In the past this was an efficient way of storing data in that the security resources of a server were considered more secure and efficient than trying to store the same data on the client side device.

However the advent of more sophisticated hacking attacks and the inherent danger of having lots of sensitive stored data in one location for many people means that the technical, legal and business risk of storing sensitive data at a centralised location is becoming a large liability.

Conversely storing encrypted data on a client side device, while distributing the risk and liability, also presents a security issue in that typically the client device must also be used for the storage of the decryption key or the user must go through the inconvenience of storing and retrieving a decryption key from a handy nearby source. It is imperative in a secure data system to store the encrypted data and the decryption key in separate and secure locations, yet the current measures to achieve this are typically complicated and inconvenient for the user.

PRIOR ART

PCT/AU2012/000944 [WO 2013020178] [Nussbaum et al] assigned to Cocoon Data Holdings Limited discloses a methodology which, broadly, seeks to remove the need for management of encryption or decryption keys at the user level or on the user device. In this citation this management function is devolved to a separate server device which relies on authentic of relevant parties before divulging or utilising a decryption key. At page 19 lines 4 to 10 in part it is stated "a further advantage is that there is no footprint left . . . no software or secure data is installed or maintained on the executives (which is to say client) computer . . . " (Underlined words added). There is no teaching of storing the file secured by the process on the user (client) device.

US2007/0198823 [Blew et al] assigned to Educational Testing Service (see also U.S. Pat. No. 7,519,810) also has as a major objective to shield an end user from the mechanics of encryption and decryption including shielding the end user from the need to be aware of any encryption or decryption keys. In this citation encryption and decryption and the securing of a file are carried out on a server (in preferred forms by a methodology requiring data transfer between multiple servers) clearly separated from a client device and there is no teaching of storing the file secured by the process on the client device.

Embodiments of the disclosed invention are designed to address these issues.

NOTES

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

BRIEF DESCRIPTION OF INVENTION

Definitions:

Client server environment: an arrangement of computing resources having a topology wherein client devices communicate over a network with at least logically and in most instances usually physically separate server devices. Broadly the server devices will usually have greater resources than the client devices and the client devices rely, at least in part, on communication with one or more of the server devices to carry out tasks on the client device.

Encryption/decryption: in relation to a file containing data a methodology involving applying an algorithm such that the data is reformatted in a way which renders it substantially indecipherable unless a reverse algorithm is then applied to the data so as to return it to its unencrypted form. In preferred forms a "key" is used as a reference element in the algorithm. In some forms the same key is used to encrypt the data as to decrypt the data. In other forms the key used for encryption is different to the key used for decryption. Encryption is to be distinguished from simple password protection where access to the data within a file requires a password but the data itself within the file is not reformatted.

Authentication: authentication in this specification is a methodology whereby the identity of an entity is ascertained to a predetermined level of certainty-usually as a precursor to permitting execution of functionality specific to, related to, authorised by or permitted by that entity. In its simplest form authentication is often carried out by a combination of a username and a password—that is the provision of a given username with a corresponding password pair comprises authentication. The entity may be an individual operating software on a particular platform or the entity may be the platform itself. By way of example client devices such as a smart phone may qualify as an entity. A given user of the smart phone may also qualify as an entity as an alternative to or as well as the smart phone.

Accordingly in one broad form of the invention there is provided in a client server environment a method of securely storing data; said method comprising generating a data element at a first location encrypting the data element at the first location thereby to form an encrypted data element transmitting the encrypted data element to a second location remote from the first location storing the encrypted data element at the second location.

In a further broad form of the invention there is provided in a client server environment a method of securely storing data; said method comprising:

generating a data element at a second location; transmitting the data element to a first location separate and remote from the second location;

encrypting the data element at the first location thereby to form an encrypted data element;

transmitting the encrypted data element to the second location separate and remote from the first location and storing the encrypted data element at the second location; and wherein the second location is constituted as a client device.

Preferably a decryption key for the encrypted data element is stored at the first location.

Preferably the second location is a client device.

Preferably the client device is programmed to execute a Web enabled application which has a storage capability.

Preferably the encrypted data element is stored on the client device utilising the storage capability of the Web enabled application.

Preferably the Web enabled application is a Web browser.

Preferably the web browser executes HTML 5 including the HTML 5 local storage function.

In a further broad form of the invention there is provided in a client server environment a method for storing data securely; said method comprising encrypting the data at a first location using a processor located at the first location; the data thus encrypted comprising encrypted data which requires a key to decrypt the encrypted data; the key stored at the first location; the encrypted data transmitted to a second location remote from the first location and stored at the second location until further processing is required to be done on the data at which time the encrypted data is transmitted to the first location and unencrypted by applying the key to a decryption algorithm executed by the processor.

In a further broad form of the invention there is provided in a client server environment an apparatus for secure storage of data; said apparatus comprising a first processor at a first location which encrypts data utilising a key; set apparatus further comprising a second processor located at a second location remote from the first location; the data, after encryption, moved over a network to the second processor and stored in association with the second processor until the data is required for execution of an application on the first processor at which time the data is moved back from the second processor to the first processor and the first processor applies the key to a decryption algorithm to decrypt the data for use by the application executing on the first processor.

In a further broad form of the invention there is provided a method of isolation from its key of data encrypted by means of the key and whereby separate retrieval of the key by a user for decryption of the data is not required; said method comprising-, in a client/server environment, receiving data from the server during an unencrypted window period; working on the data on the client during the unencrypted window period; transmitting the data to the server at the end of the unencrypted window period; the server encrypting the data with reference to the key to form encrypted data; the server then transmitting the encrypted data to the client; the server then deleting all of the data and the encrypted data on the server thereby terminating the unencrypted window period; the key remaining stored only on the server.

In a further broad form of the invention there is provided a method of isolation from its decryption key of encrypted data stored on a client device; said method comprising storing the decryption key referenced against a username account/user login-data for the client device on a separate device;

retrieving the data by transferring the encrypted data to the separate device and upon authentication of the user login/username account decrypting the encrypted data using the decryption key.

Preferably the separate device is a Web server.

Preferably the user login is a username and password.

In a further broad form of the invention there is provided in a client server environment a secured non-use window where data is stored securely on the client has encrypted data requiring decryption by decrypting the encrypted data and wherein the decryption key is not stored on the client.

Preferably the decryption key is stored on the server.

Preferably the encryption/decryption is not done on the client.

Preferably the encryption/decryption is done on the server.

Preferably the decryption key is released for use if and only if authentication of a client/service session is validated.

Preferably the environment requires authentication at the user level.

Preferably decryption key is referenced against the authentication.

Preferably authentication is at the user device level.

Preferably the data is a small data quantum.

Preferably the data quantum is 100 MB.

Preferably the data quantum is 50 MB.

Preferably the data quantum is 10 MB.

Preferably the data quantum is 1 MB.

Preferably the data quantum is 0.5 MB.

Preferably the data quantum is 0.1 MB.

Preferably the data is only changed incrementally, if at all, each user session.

Preferably only some elements of the data are changed, if at all, each user session.

In a further broad form of the invention there is provided a method of securely storing data; said method comprising generating a data element at a first location encrypting the data element at the first location thereby to form an encrypted data element transmitting the encrypted data element to a second location remote from the first location storing the encrypted data element at the second location.

Preferably a decryption key for the encrypted data element is stored at the first location.

Preferably the second location is a client device.

Preferably the client device is programmed to execute a Web enabled application which has a storage capability.

Preferably the web enabled application executes HTML 5 including the HTML 5 local storage function.

Preferably the encrypted data element is stored on the client device utilising the storage capability of the Web enabled application.

Preferably the Web enabled application is a Web browser.

In a further broad form of the invention there is provided a method for storing data securely; said method comprising encrypting the data at a first location using a processor located at the first location; the data thus encrypted comprising encrypted data which requires a key to decrypt the encrypted data; the key stored at the first location; the encrypted data transmitted to a second location remote from the first location and stored at the second location until further processing is required to be done on the data at which time the encrypted data is transmitted to the first location and unencrypted by applying the key to a decryption algorithm executed by the processor.

In a further broad form of the invention there is provided an apparatus for secure storage of data; said apparatus comprising a first processor at a first location which encrypts data utilising a key; set apparatus further comprising a second processor located at a second location remote from the first location; the data, after encryption, moved over a network to the second processor and stored in association with the second processor until the data is required for execution of an application on the first processor at which time the data is moved back from the second processor to the first processor and the first processor applies the key to a decryption algorithm to decrypt the data for use by the application executing on the first processor.

DRAWINGS

Embodiments of the present invention will now be described with reference to the accompanying drawings wherein:

FIG. 1—Main components of the example embodiment.

Figure 2:
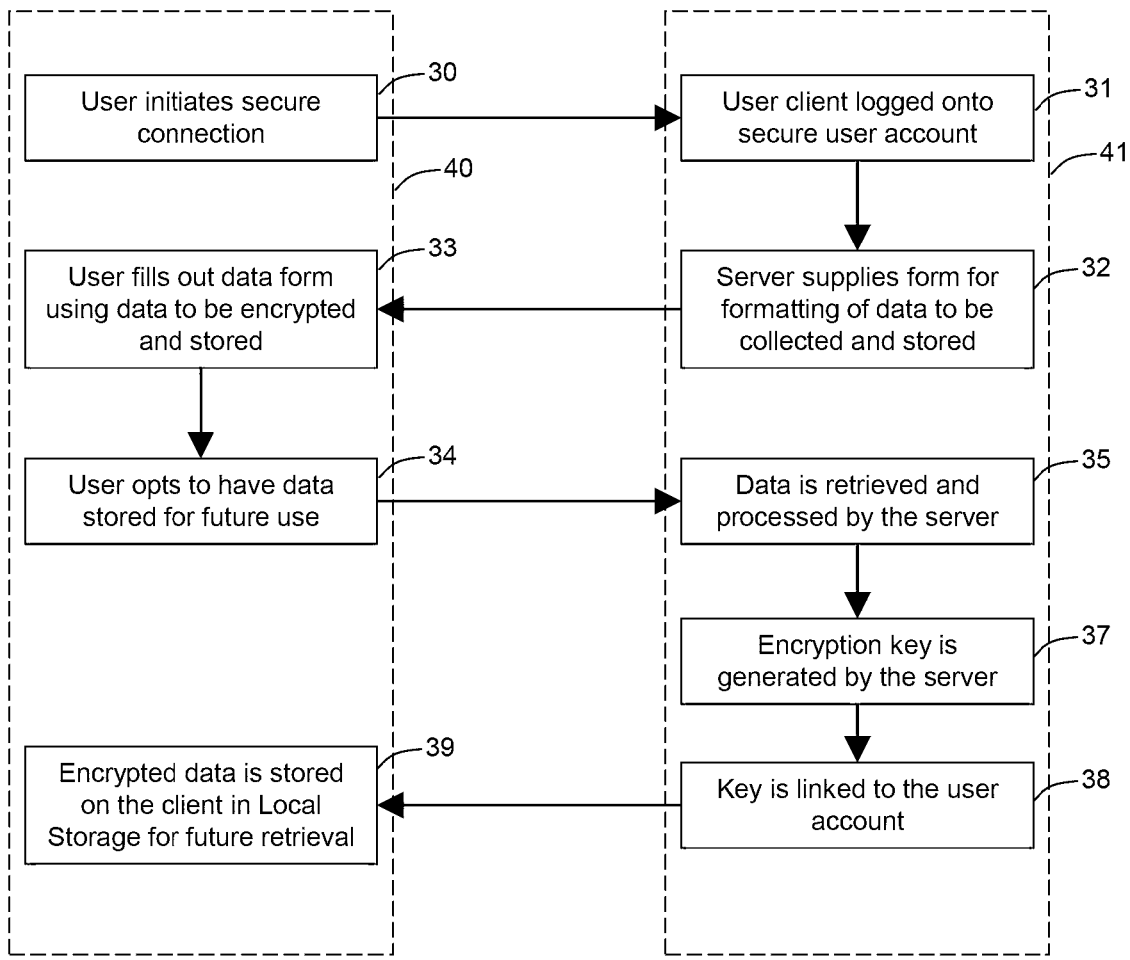

FIG. 2—Control process for initial storage of data in accordance with an embodiment of the invention.

Figure 3:
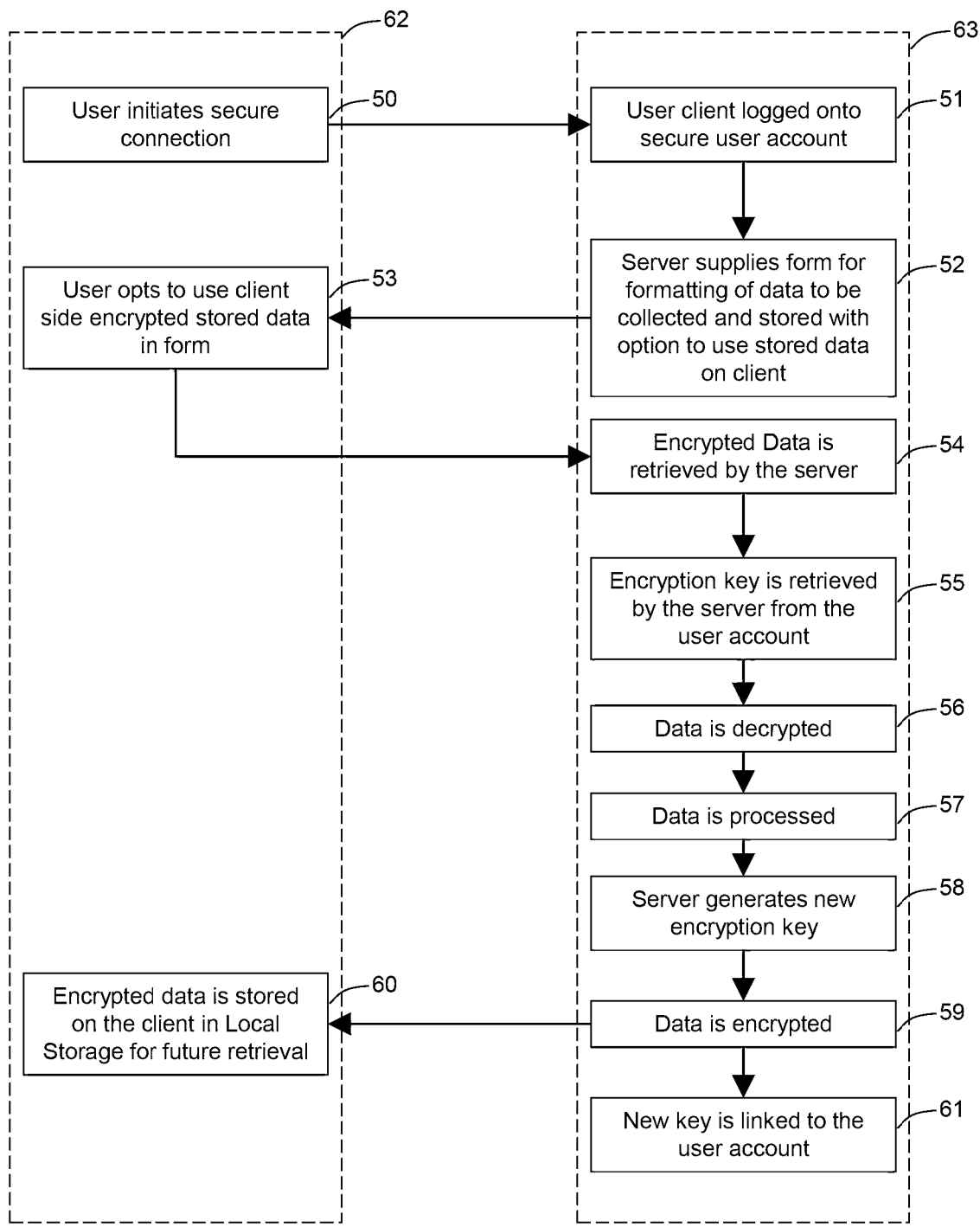

FIG. 3—Control process for subsequent use of encrypted data in accordance with an embodiment of the invention.

Figure 4A:
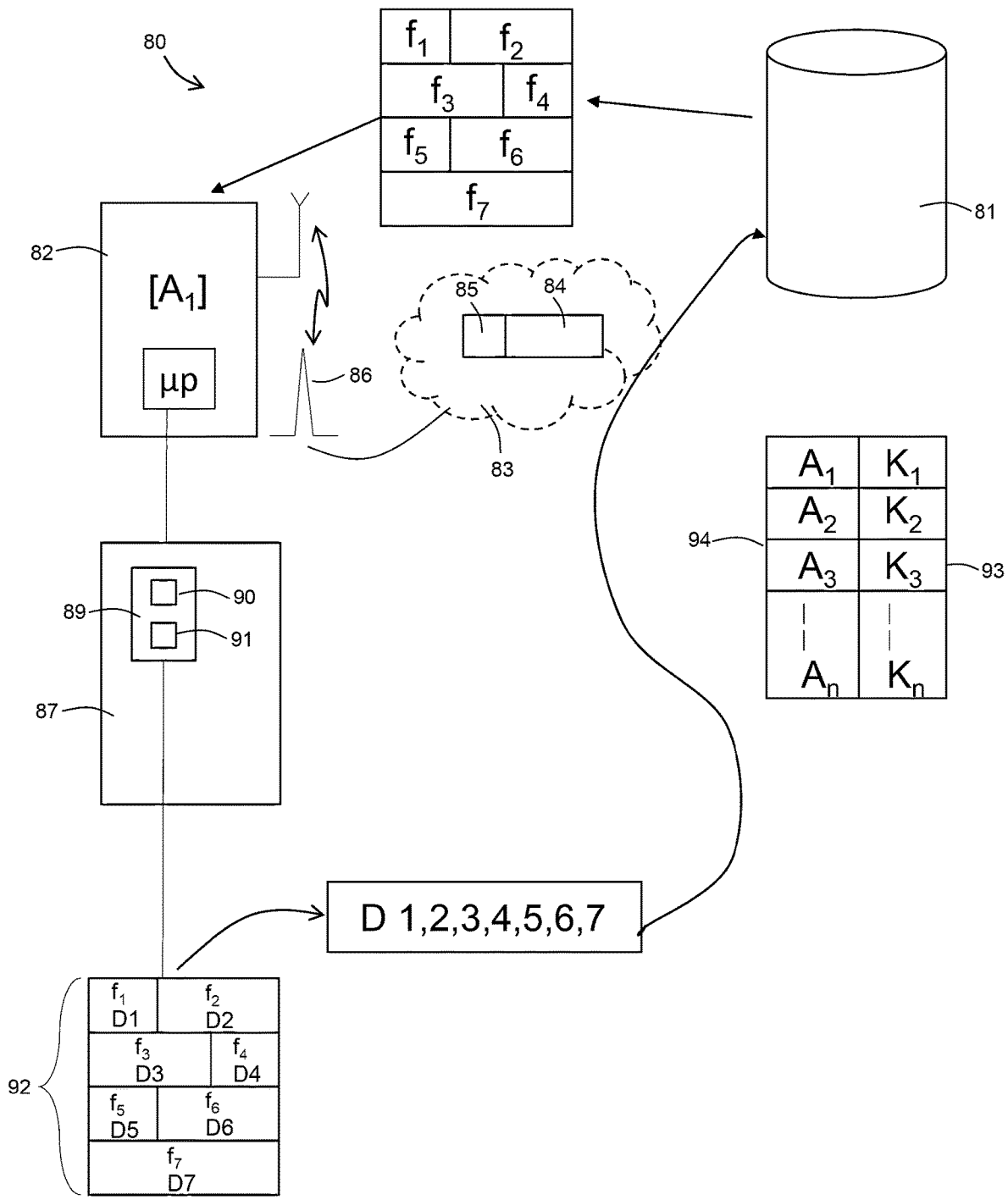

FIGS. 4A, B, C describe in diagrammatic form one form of execution of an example embodiment of the invention.

Figure 5:
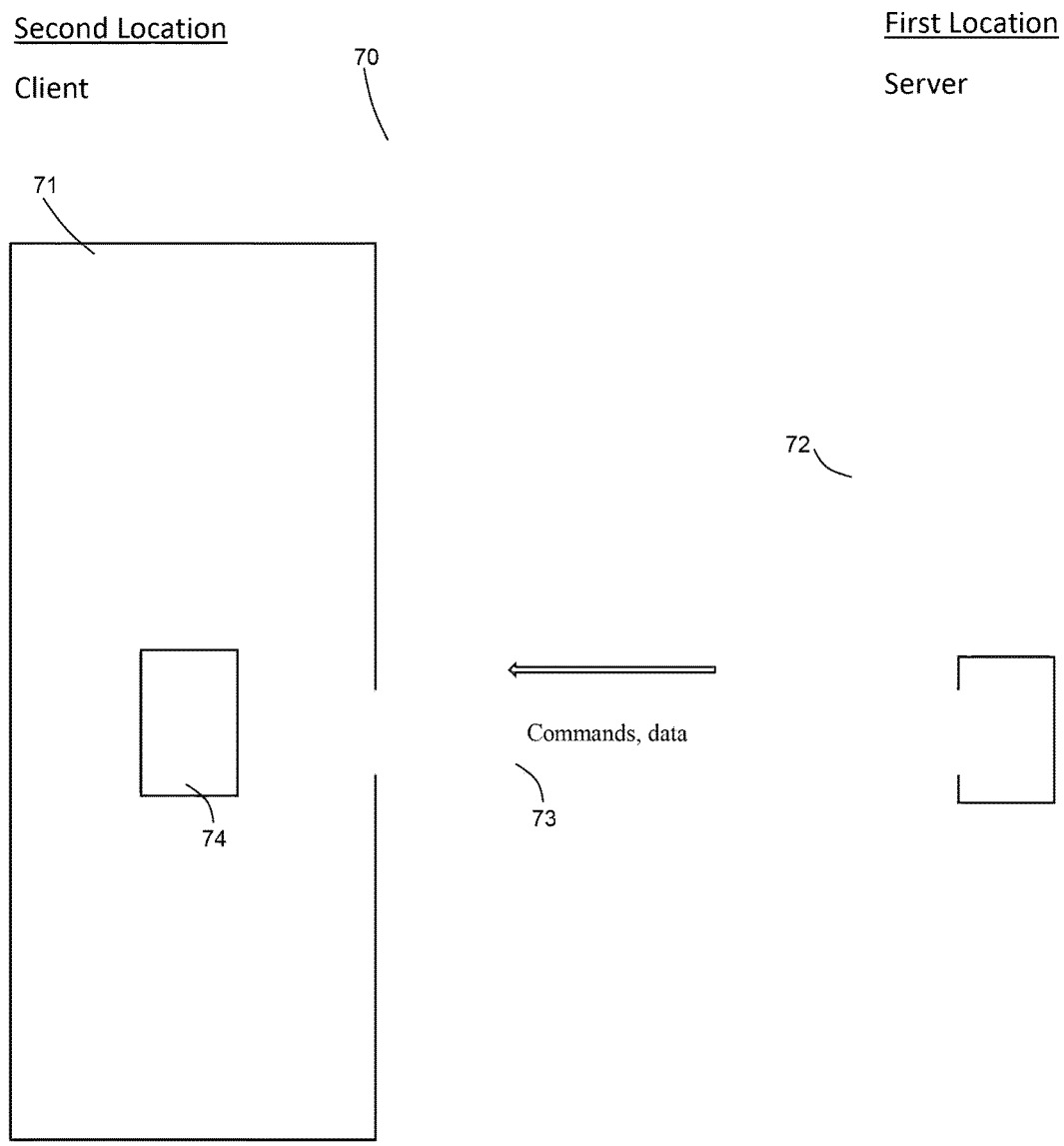

FIG. 5 illustrates in block diagram form a client/server environment suitable for use with any of the described embodiments.

Figure 6B:
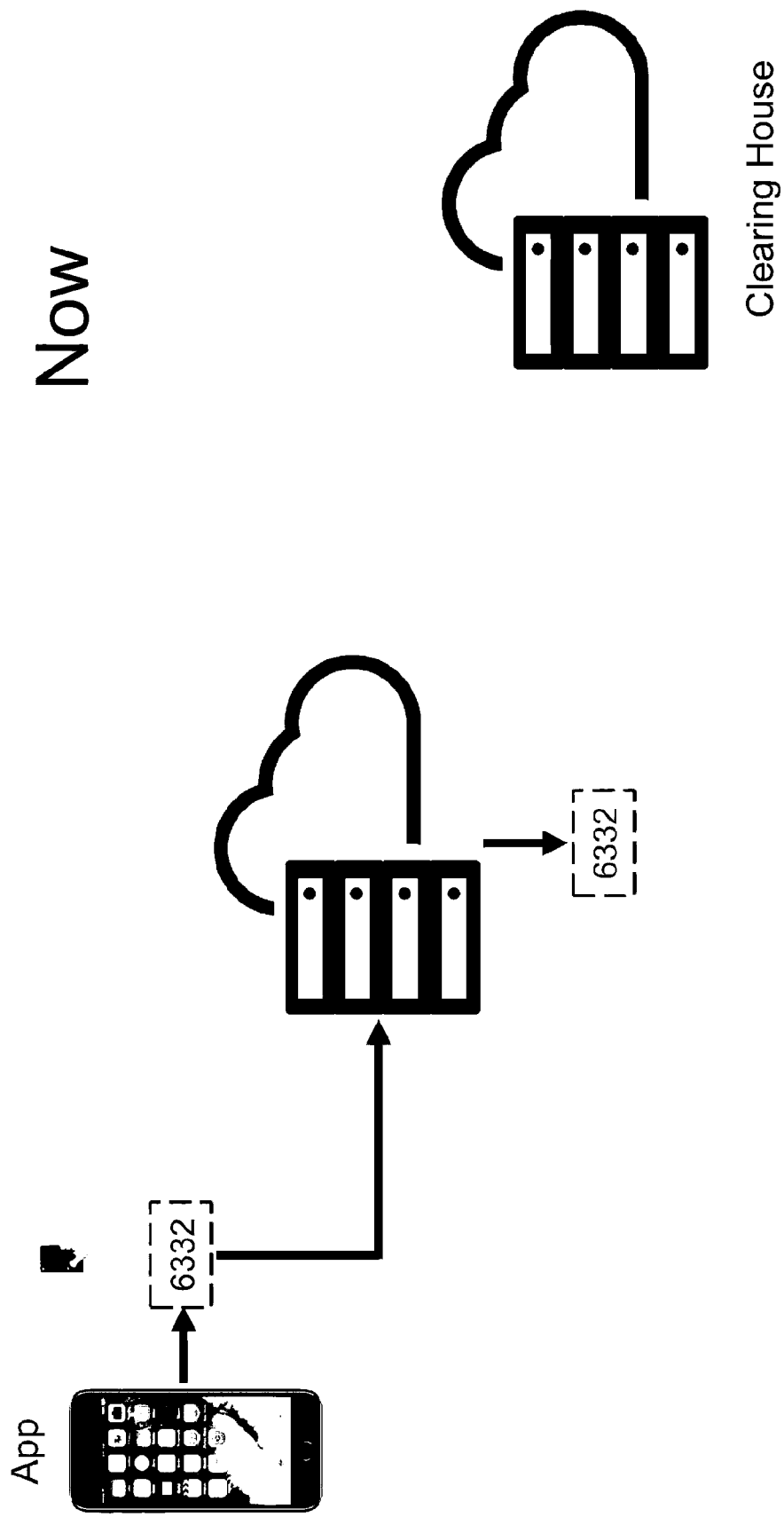
Figure 6C:
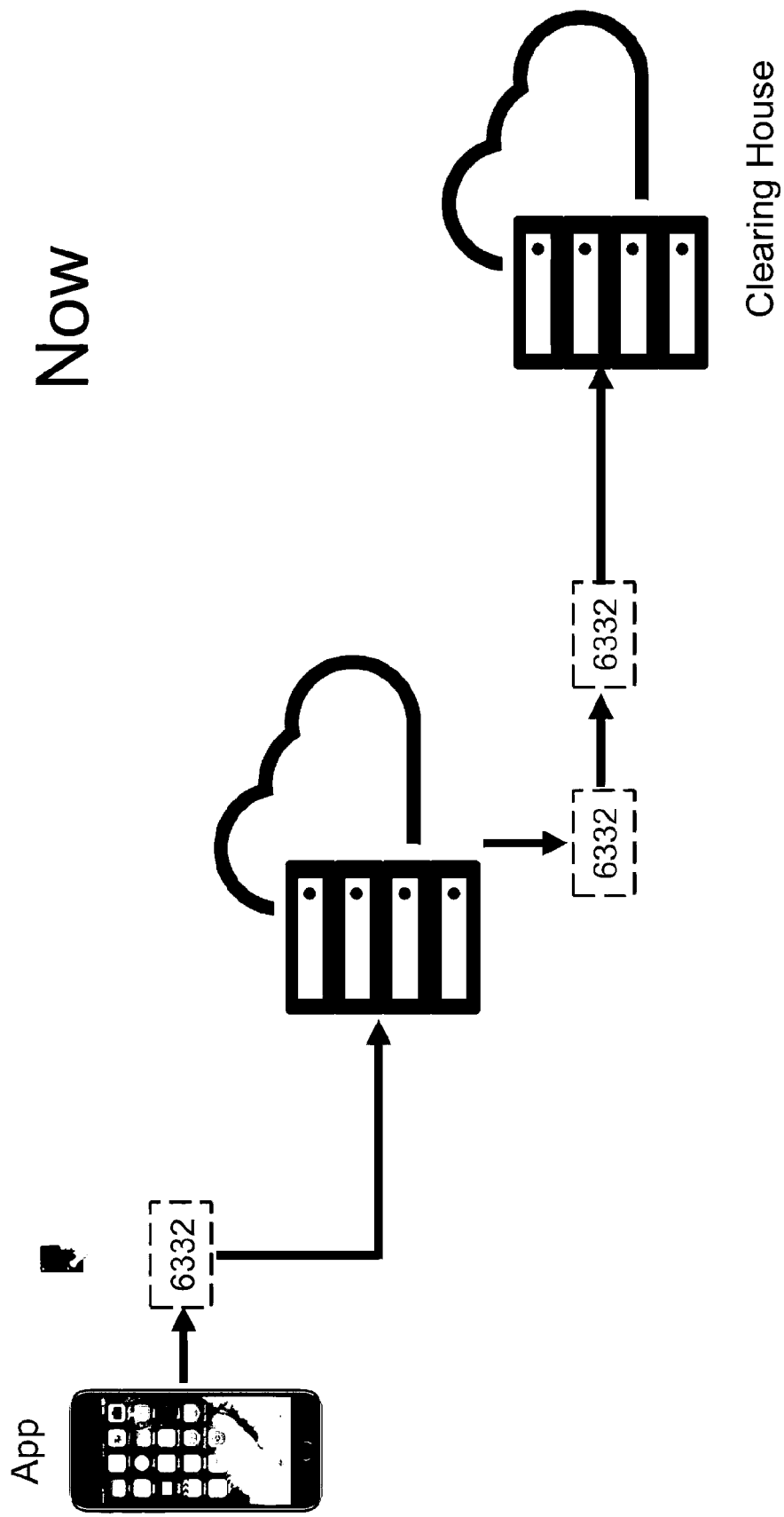
Figure 6E:
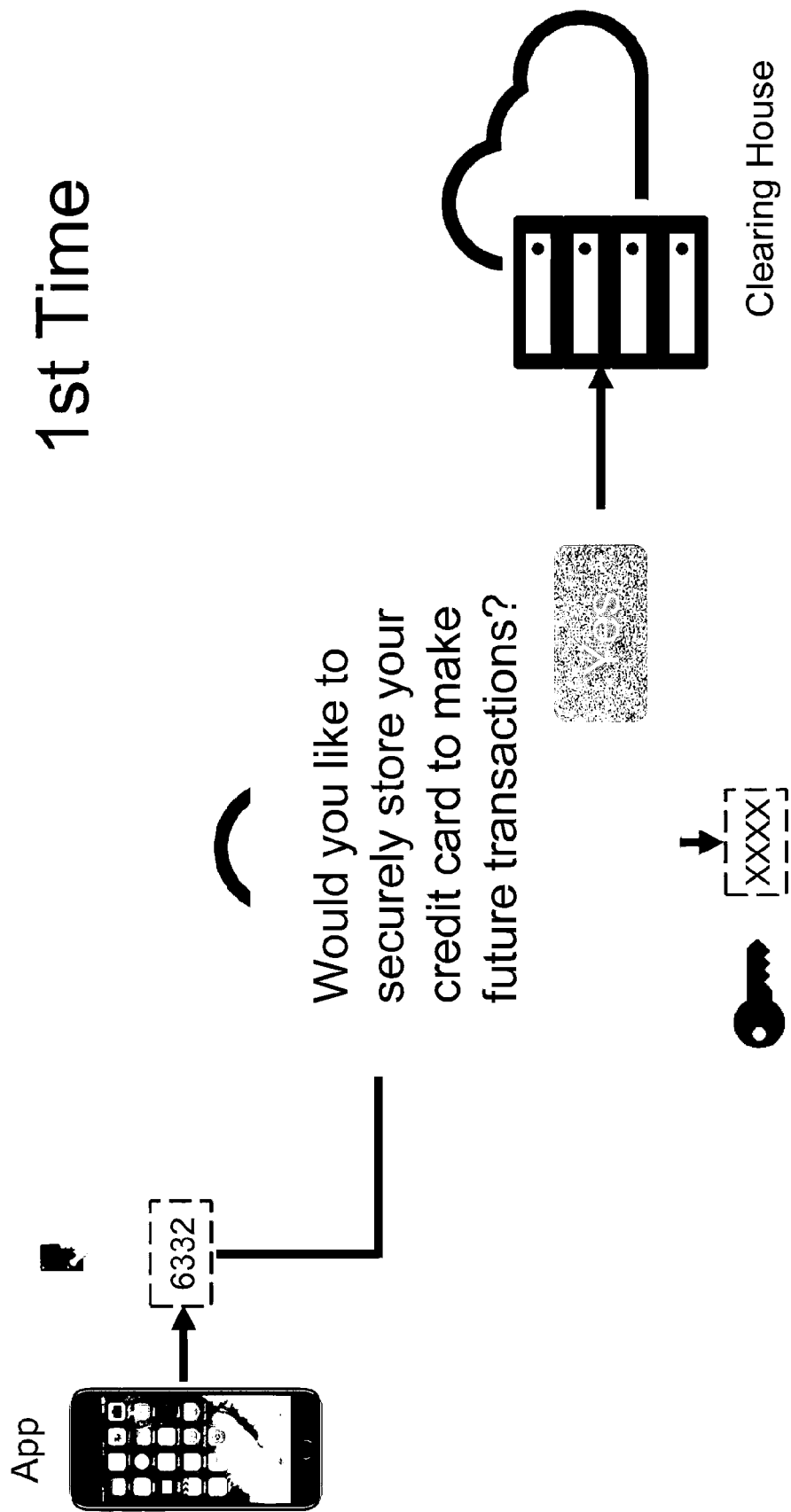
Figure 6F:
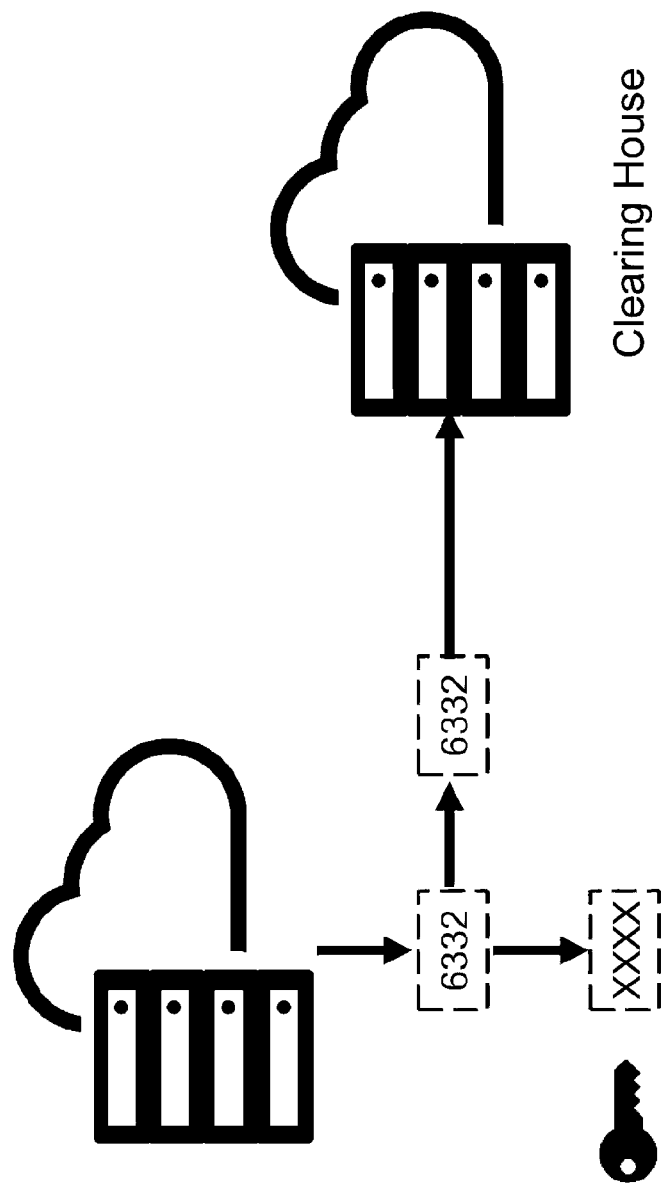
Figure 6H:
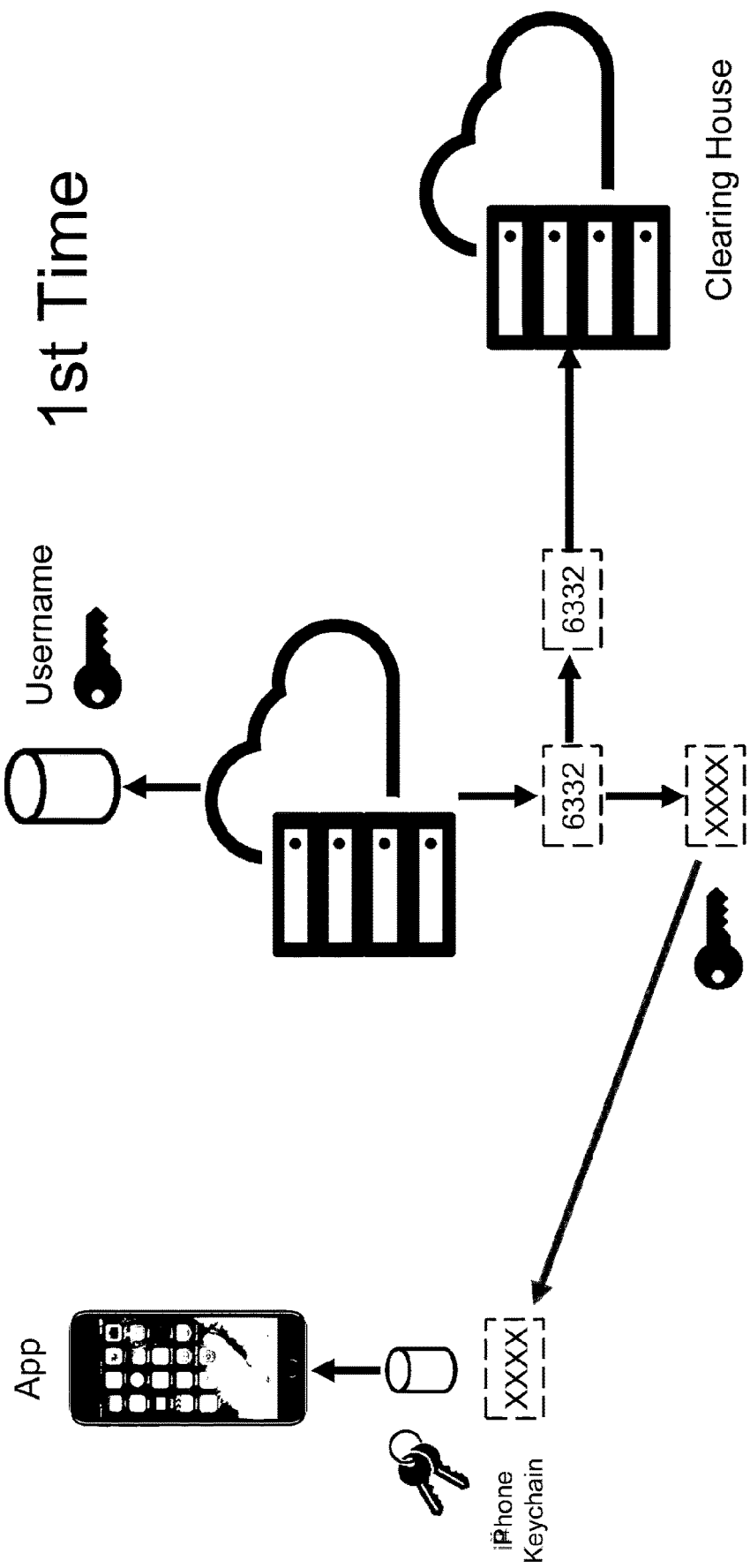
Figure 6I:
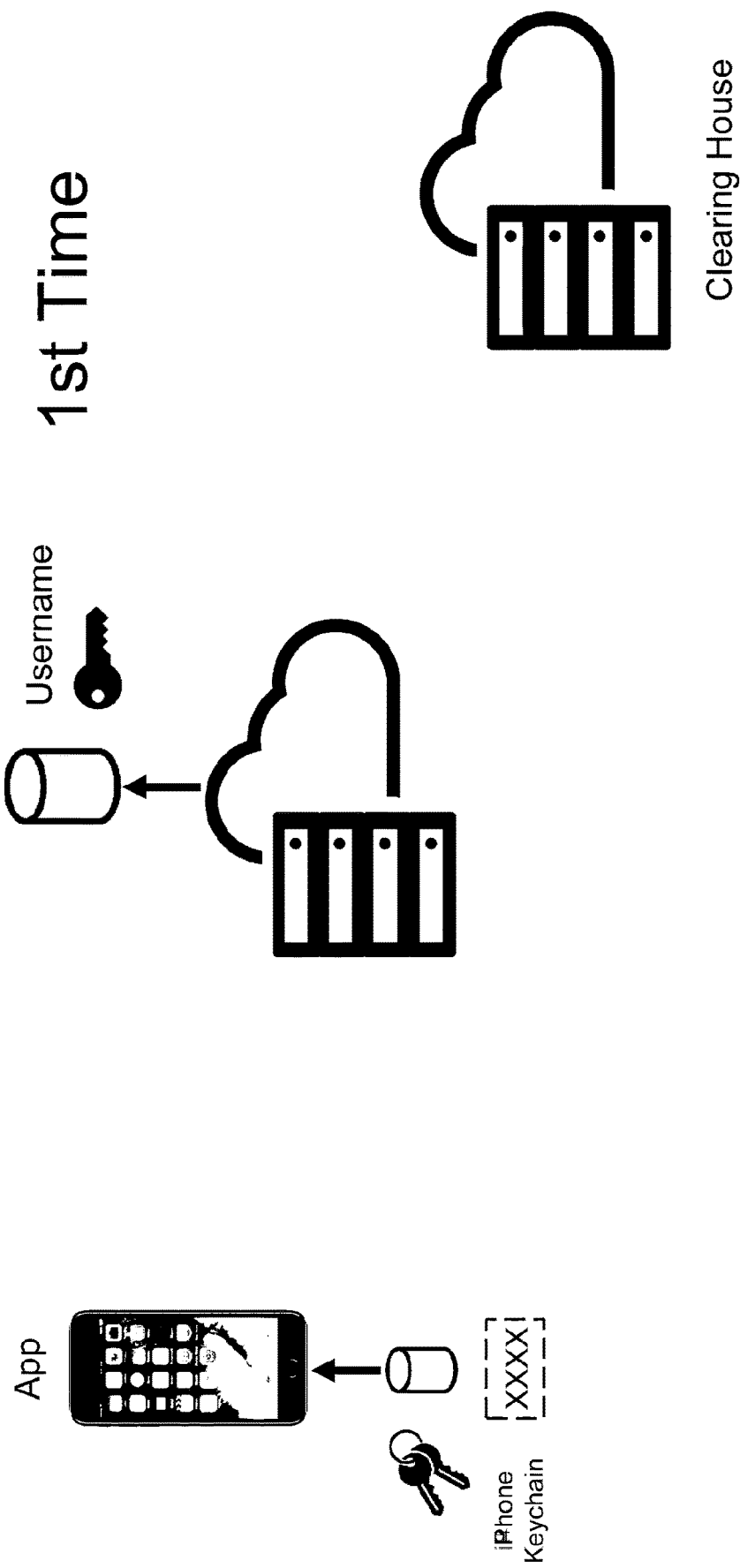
Figure 6J:
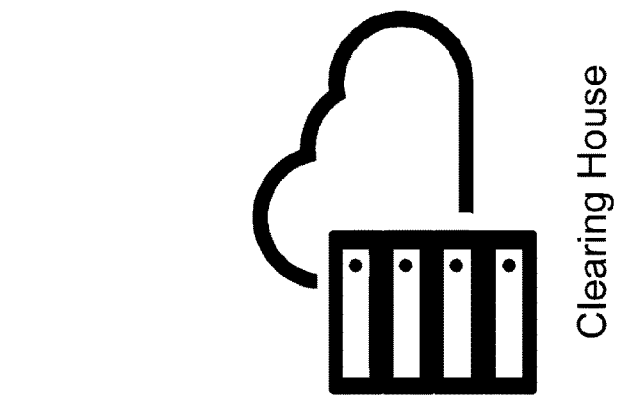
Figure 6J:
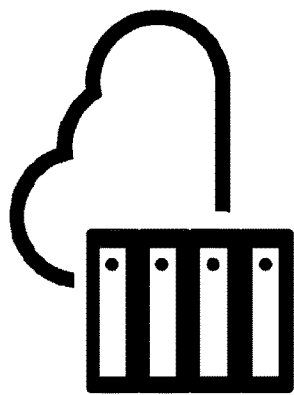
Figure 6J:
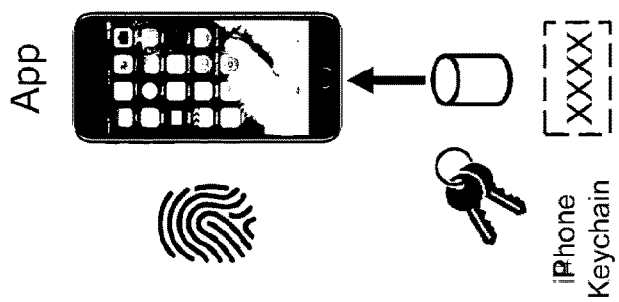
Figure 6K:
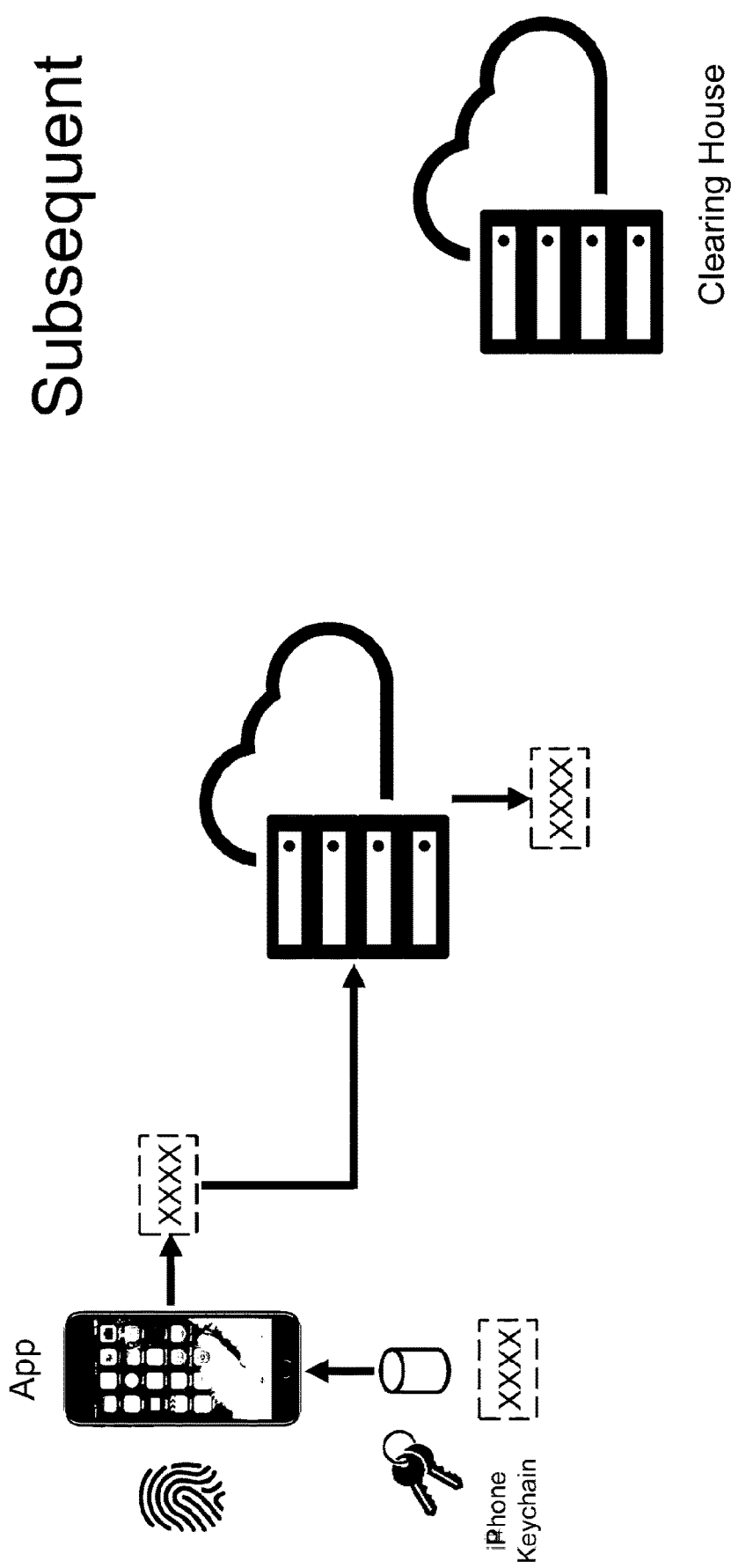
Figure 6L:
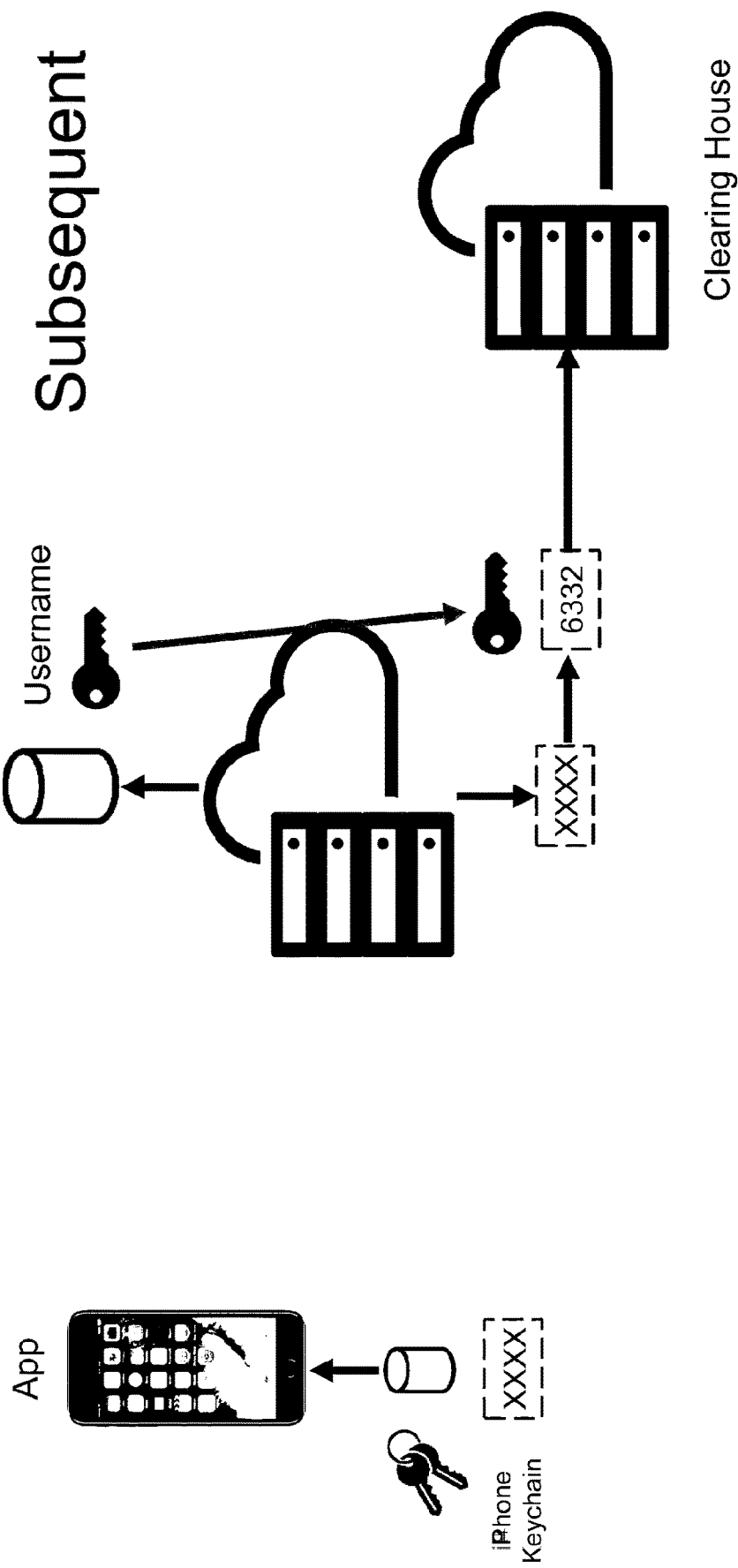
Figure 6M:
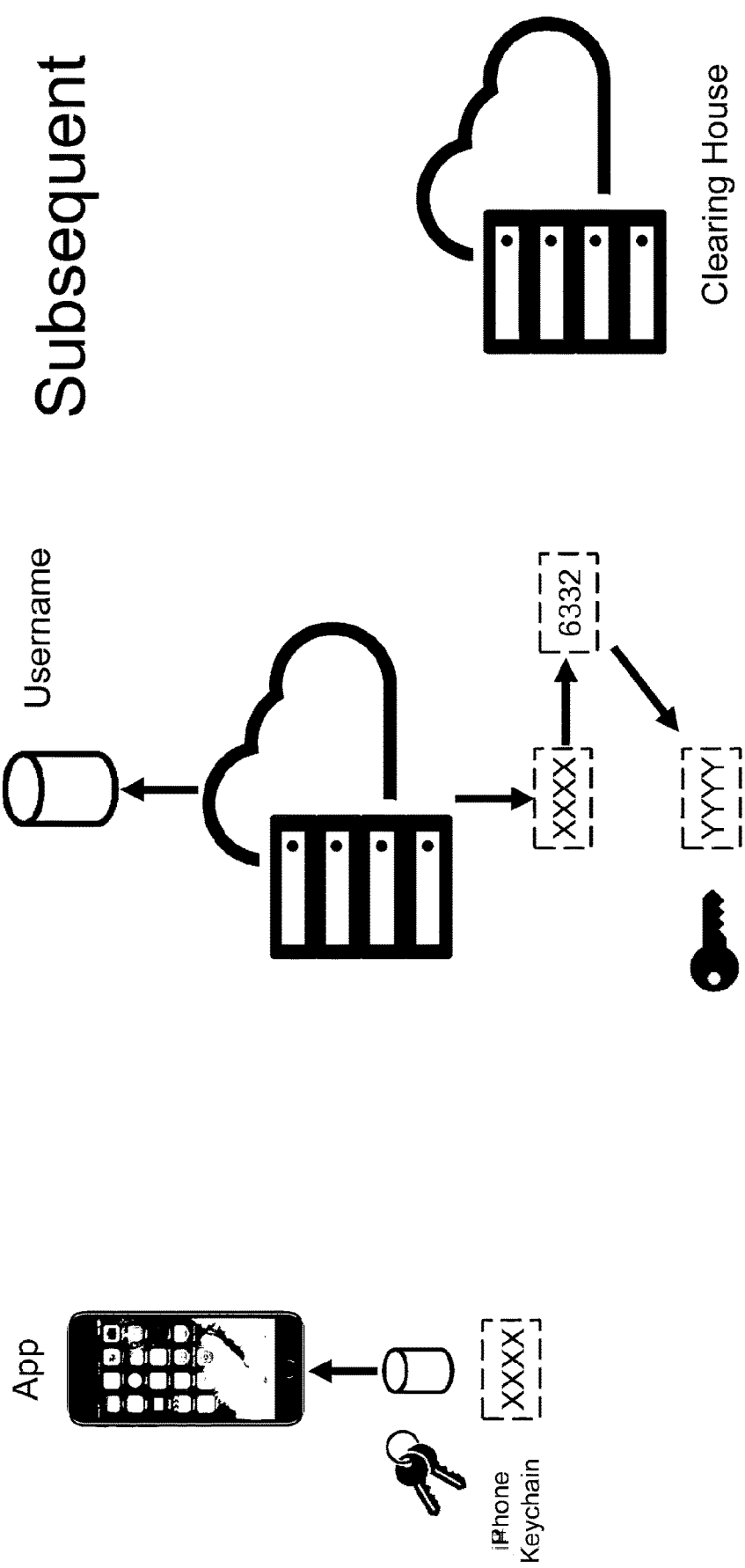
Figure 6N:
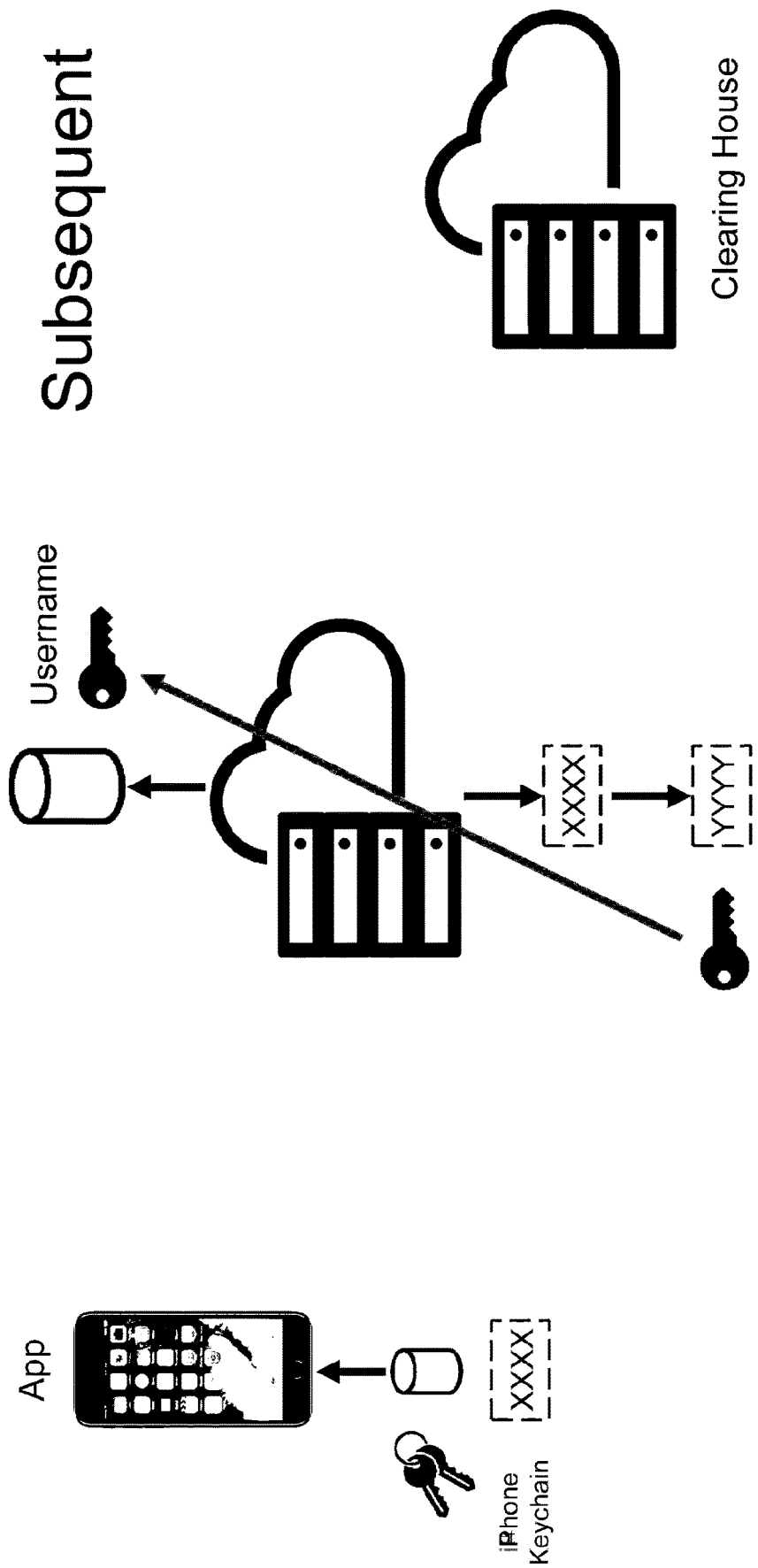
Figure 6O:
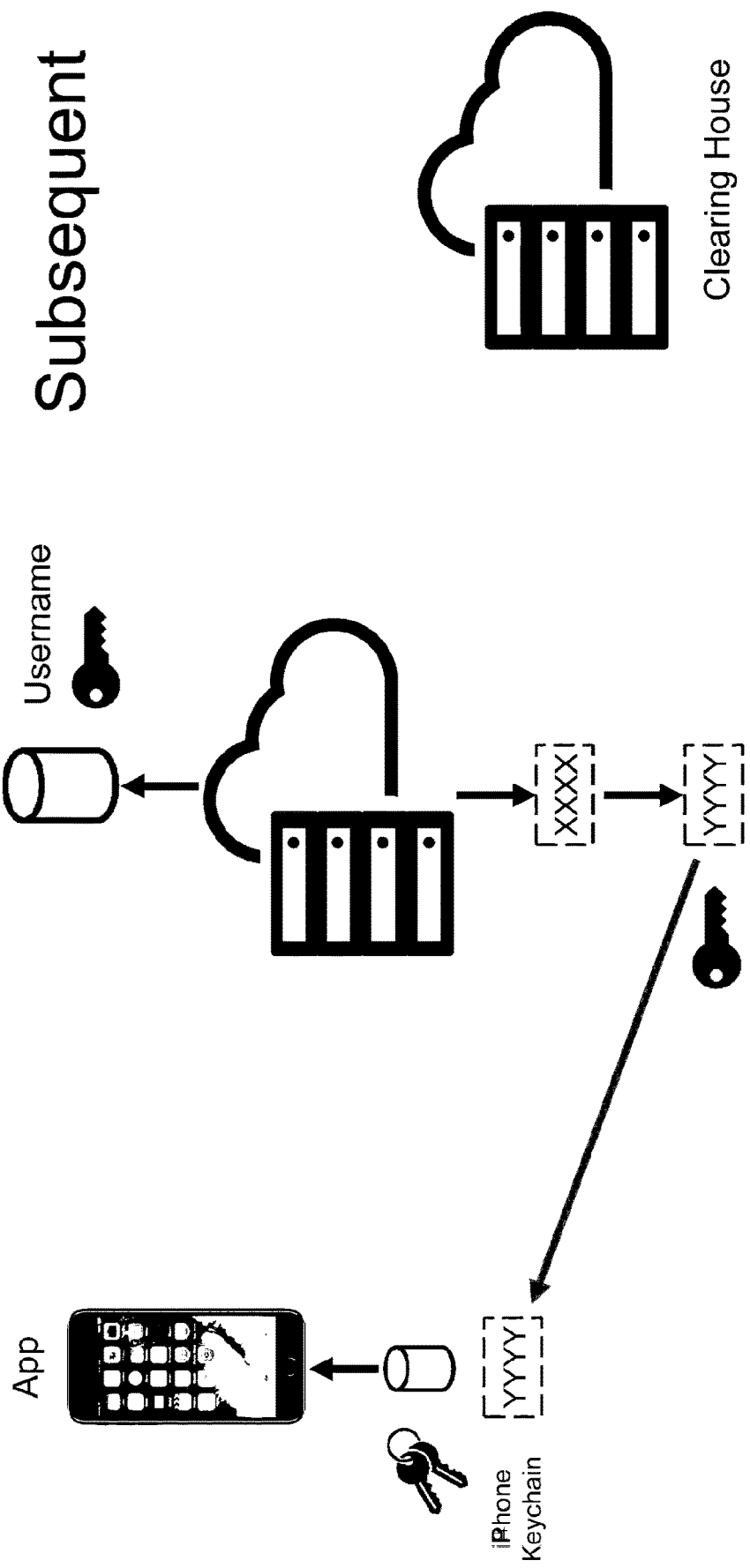
Figure 6P:
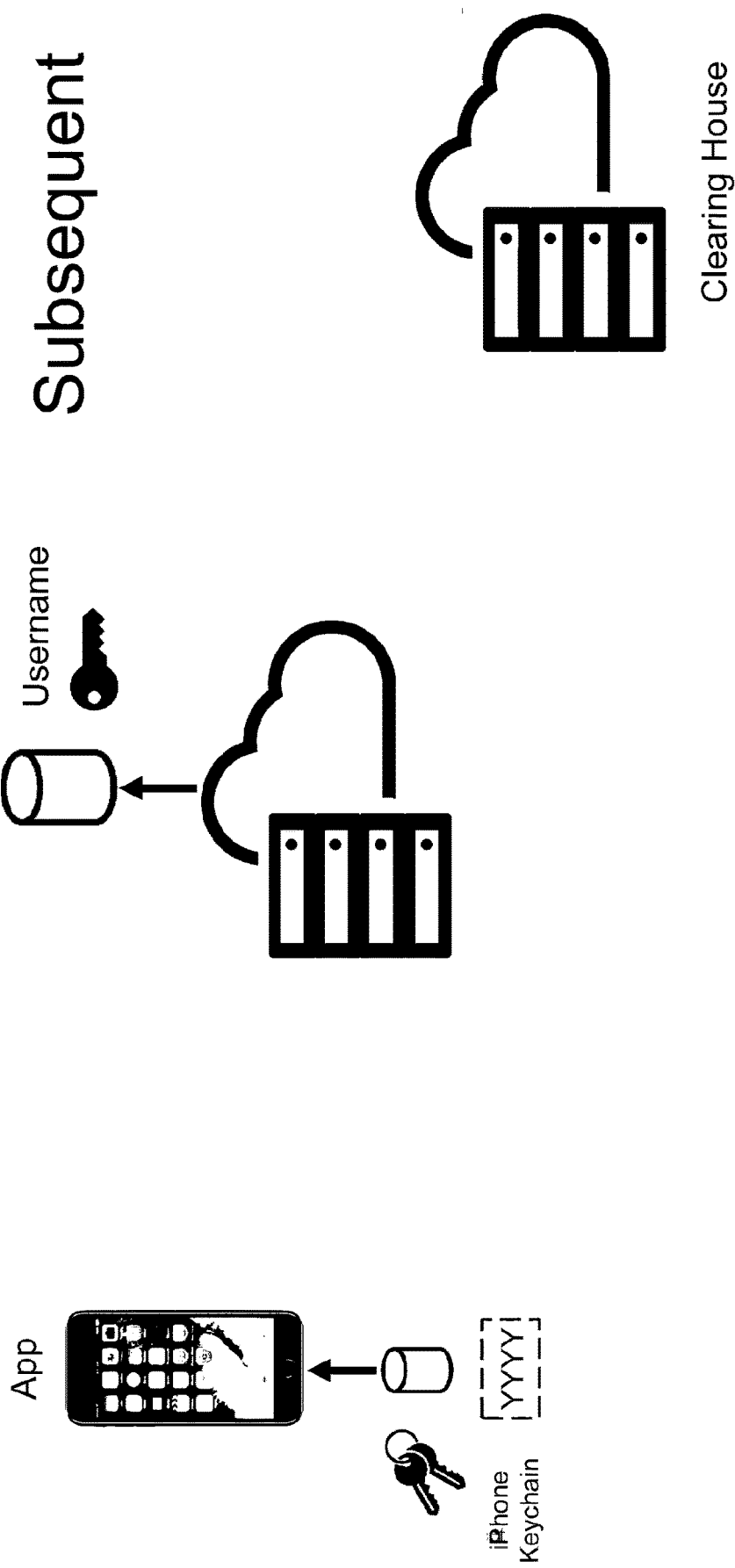

FIGS. 6A-P illustrates steps in execution of an example of an embodiment of the invention, and use.

DESCRIPTION AND OPERATION

FIG. 1 describes the main components of an example embodiment. In the example embodiment the client device 10 stores an encrypted version of the data being stored 11. However the key to decrypt the data 18 is not stored on the client 10 but is stored on a server 14 that is usually accessible over a network 15 such as the Internet.

The key 18 to decrypt the data 11 is stored on the server 14 in association with a specific user account 17 in a database of users 16 that have secure access to the server 14.

The encrypted data 11 is stored in the domain related Local Storage1 area 13 of a browser 12 or web enabled application 12 running on the client device 10.

The server 14 is used for various processes associated with and involving the encryption2, collection and processing of the data which is subsequently stored on the client 10 as an encrypted data file 11.

FIG. 2 discloses the control process for the initial storage and encryption of data. The user 40 initiates a secure connection 30 to the server 41 and the client device is logged onto a secure user account 31. Subsequently the server 40 supplies a form for use by the user to format the data to be secured 32 and the user fills out the form with some or all of the data to be secured 33. The user then opts to store the data securely on their client device 34.

The server then retrieves the entered data and processes it 35. Processing may or may not include data verification and integrity checking. Subsequently an encryption key is generated by the server 36 and the key is linked to the current user's account 37.

The key is then used to encrypt the data to be protected 38 and the resulting encrypted data file or files is stored on the client device in the browser or web enabled applications Local Storage for future retrieval 39.

FIG. 3 shows a control process for the subsequent use of encrypted data. Initially the user starts a secure connection 50 and the server then establishes a secure connection using a user account 51.

During the course of use the server may present the user with a form to collect information that the user has opted to encrypt and securely store on their device in the past 52. The user is then given the option and chooses to use the encrypted data already stored on their client device 53.

Subsequently the server retrieves the encrypted data from the client Local Storage 54. The server then retrieves the decryption key from the associated username account 55 and the data is decrypted on the server to memory 56 and the data is processed as needed 57.

Subsequently the server generates a new encryption key which is used to re-encrypt the data 59 so that it can be safely stored again on the client device Local Storage 60. The new encryption key is then stored with the user account in the anticipation of future decryption and use 61.

Example Embodiment

FIGS. 4A, B, C illustrate in diagrammatic form one form of topology and execution of an example embodiment of the invention.

In this instance, with reference to FIG. 4A, a storage system 80 relies on a server 81 in communication with client device 82 in this instance over network 83. In this particular instance network 83 includes the internet which itself comprises an interconnected network of computers adapted for transmission of packet data 84 to destinations identified in header 85. In many circumstances client device 82 will be in electronic communication with network 83 by way of initial link 86 which may comprise a mobile telephone network or other radio communication network such as wifi or the like.

Unsecured Window Period

In this instance, client device 82 includes a client device memory 87 and client devices processor 88 whereby code 89 stored in memory can be executed by processor 88. In this instance the code 89 includes an application adapted to receive commands 90 and data 91 from server 81. In this instance the commands 90 and data 91 permit creation of form fields F1-F7 in a form structure 92. In preferred forms the form structure 92 is determined on server 81 and forms part of the commands 90 and data 91 transmitted to client device 82 during the unsecured window period. Each form field can receive respective data D1-D7 which may be received from the server 81 as data 91 or may be inserted by a local user of the client device 82. The form structure 92 and data 91 is presented in unsecured form during an unsecured window period of storage system 80. During this period the data D1-D7 is transmitted from client device 82 to server 81. Server 81, typically located at a location physically remote from client device 82, received data D1-D7 over either a secured or unsecured data channel and saves data D1-D7 in server memory 93 referenced against an entity account 94.

Secured Window Period

Figure 4B:
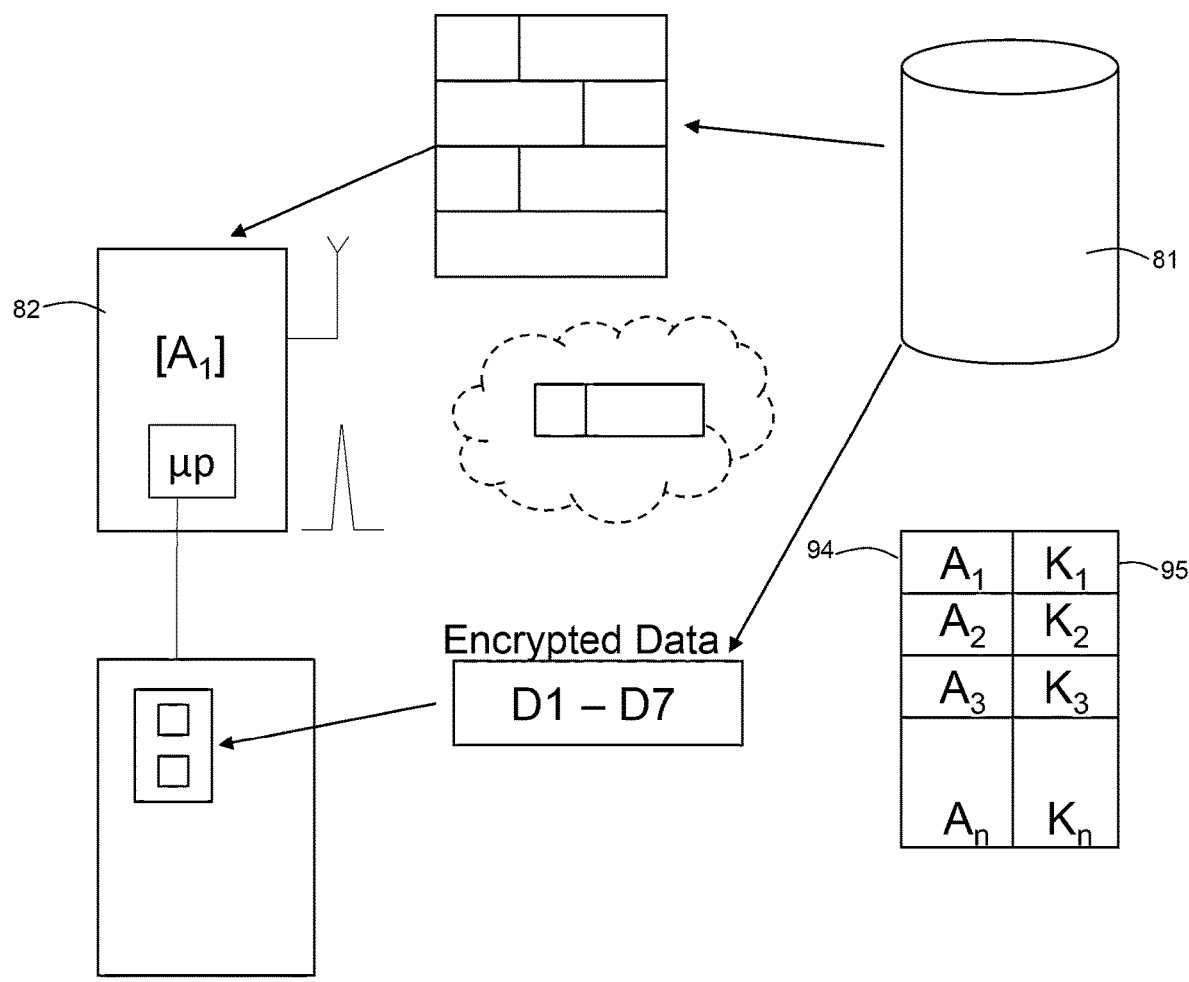

With reference to FIG. 4B a secured window period commences when server 81 encrypts data D1-D7 with reference to at least one key 95 so as to form encrypted data 96 which is then transmitted by server 81 to client device 82 which is to say the client device 82 which formulated data D1-D7 and from which the data was transmitted to server 81 referenced against entity account 94. In one form an entity account may be owned by the client device 82 itself. In another form the entity account may be owned by a user of the code 89 executed on the client device 82 from which the data D1-D7 originated.

In either case the server 81 references the data both before encryption and after encryption against the entity account 94.

In a preferred form the server 81 is a web server. In an alternative preferred form the server may serve application functionality in the form of an API or the like for execution as code 89 on client device 82.

Once the data D1-D7 has been encrypted and transmitted to client device 82 the server 81 deletes all instances of data D1-D7 from its storage—whether in an encrypted or unencrypted form leaving the only key 95 stored against the entity account 94.

During this secured window period the client device 82 stores the encrypted data 96 locally in client device memory 87. It is to be noted that the key 95 is not provided to the client device 82.

Subsequent Use of Data D1-D7

Figure 4C:
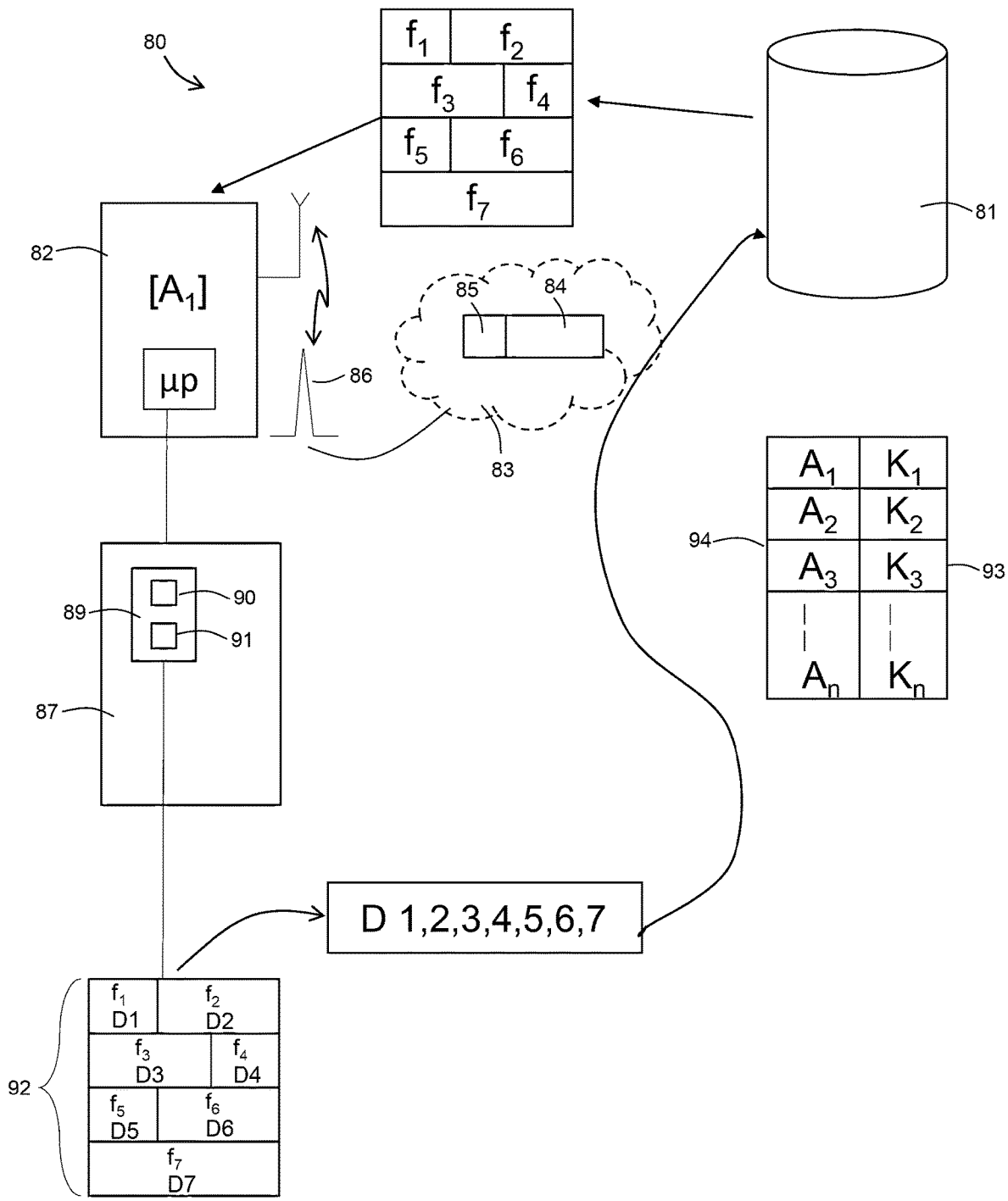

With reference to FIG. 4C in sessions comprising execution of code 89 as subsequent sessions to an initial session on client device 82 an unsecured window session is initiated during a subsequent unsecured window period during which execution of code 89 causes transmission of encrypted data 96 to server 81 where upon, following authentication of entity account 94 corresponding key 95 is utilised to decrypt data D1-D7 and transmit it over either a secured or unsecured channel from server 81 to client device 82. In a preferred form the data D1-D7 will repopulate the form structure 92 on the client device 82. This data may then be used for various functionality on the client device 82. The data D1-D7 may be amended during the subsequent session during the subsequent unsecured window period. When a user of the client device 82 or the client device itself terminates the subsequent unsecured window period the data D1-D7 is transmitted to server 81 as described with reference to FIG. 4A and a subsequent secured window period is initiated as described with reference to FIG. 4B.

In a preferred form a user of client device 82 may be given the option as to whether to invoke the procedure described above.

Client Server Environment

With reference to FIG. 5 there is illustrated in block diagram form the topology of a typical client/server environment 70 which, in this instance, comprises at least one client device 71 and at least one server 72.

The client device 71 is in data communication with the server 72 via a data communication channel 73. In some instances this channel 73 may be unidirectional. In other instances the channel 73 will be bidirectional.

In preferred forms the channel 73 or at least part of it is implemented over the Internet whereby data is communicated in packet form, each packet comprising at least a header containing target address information and a data portion containing a data "payload".

In preferred forms data for of a webpage on the client 71 resides on server 72 and is delivered from the server 72 to the client 71 on request made by the client to the server. In some forms the data comprises a series of commands which, upon execution on the client 71, result in communication of data on the client device 71—usually by way of a visual interface, often display of a webpage 74.

The webpage 74 itself typically is comprised of a multitude of data portions—some of which are constructed by the client 71 executing the commands received from the web server 72 whilst other portions may be comprised of data entered into the client by way of local input output operated by a user of the client device 71.

A common command language in use today is the HTML language.

In Use—Example 1

FIGS. 6A-P disclose in block diagram format an example application of the system.

FIG. 6A—What Happens Initially

With reference to FIG. 6A an application 101 runs on the user device 100—in this instance a smart phone.

FIG. 6B—Enters Form, Gets Transferred to Server

With reference to FIG. 6B user 102 fills out, in this example, their flight details and payment details in fields 105 on a form 103 displayed on touch enabled display 104 of the user device 100.

In this instance there are seven fields F 1, F 2 . . . F 7 each containing respective data entries D 1, D 2 . . . D 7.

In this instance the user device 100 is in first data communication with a Web server 106 whereby data pertaining to a given transaction 108 initiated on user device 100 is exchanged as between the user device 100 and the server 106.

In some forms the server 106 may itself be in separate second data communication with server 107. Server 107 may for example utilised by financial intermediaries for the purpose of facilitating funds transfer including, for example, payment authorisation as between the parties involved in the transaction 108.

FIG. 6C—Data Copied to Clearinghouse Form (Server 107) without Storing it/PCI Compliant.

With reference to FIG. 6C in this instance user 102 enters data D 12 data D 7 in the fields F1 to F7 constituting the data necessary to trigger transaction 108 whereby the data is communicated electronically to server 106. As necessary server 106 communicates with server 107 for the purpose of payment authorisation of the transaction 108.

FIG. 6D and FIG. 6E—First Time a User Uses Your Site with Application 101 ("Wallet") Enabled it Appears the Same Except With reference to FIGS. 6D and 6E, during this process the user is issued with an invitation "would you like to securely store your credit card to make future transactions?" The same invitation may be made in respect of any other data which the user wishes to have treated securely—for example other forms of payment data including financial data, medical data and the like.

FIG. 6F to FIG. 6P—Key Generation and Use Sequence

With reference to FIG. 6F—an encryption key is generated and the data is encrypted.

With reference to FIG. 6G—the encryption key is stored with the user account.

With reference to FIG. 6H and the encrypted card data is stored back on the user's device and protected by the keychain.

With reference to 6I and server memory is dumped so that only the key is on the server and the secure data is on the phone.

With reference to 6J on subsequent connections the user is authenticated.

And with reference to FIG. 6K the encrypted data passed through to the server.

With reference to 6L then the key is retrieved from the user's account and the data decrypted and delivered to the clearinghouse.

With reference to 6M then the card data is re-encrypted with a new key and

With reference to 6N the new key is stored with the user's account and

With reference to 6O the new encrypted data chunk is stored back on the user's device for the next transaction.

With reference to 6P and memory is cleared leaving only the key on the server and the encrypted data on the user's device.

Alternative Embodiments

The example embodiment re-encrypts the data with a new key every time the data is used. An alternative embodiment could see the data re-encrypted every time or at a multiple of times that the client and server connect irrespective of whether the data is processed and or used in a form or not. Conversely another embodiment could see the encrypted data using the same encryption key for an unlimited amount of time.

The example embodiment uses HTML5 Local Storage to store the encrypted data on the client. An alternative embodiment could use any storage means available on the client and accessible to a server on a web enabled application or browser.

The example embodiment is used in the context of data stored and linked to a single domain. An alternative embodiment could allow the encrypted data to be accessed across multiple domains using a technique known in the art. An example of this is where an iFrame allowing access to local storage for a secure domain area where encrypted data is stored, can be embedded within a web page that accesses and references a different secure domain space on the client, but where data from the iFrame secure area can be passed to and used by the parent or other related pages.

The example embodiment shows the user being able to optionally encrypt and store the data for future use. An alternative embodiment could see this function being an automatic process without the need for the user to opt for the data to be encrypted and stored locally.

The invention claimed is:

1. In a client server environment a method of securely storing data generated at a first location for use on a client device at a second location; the first location separate and remote from the second location; the improvement wherein said method comprises
for a first use of the method of securely storing the data at the second location by a user, executing the following steps:
the user initiates a secure connection to a first device in the form of a server;
a client device of the user at a second location is logged onto a secure user account;
subsequently the server at the first location supplies a form for use by the user to format data to be secured;
the user fills out the form with the data to be secured;
the user then opts to store the data securely on their client device at the second location;
the server at the first location then retrieves the data from the second location during an unencrypted window period and processes it;
subsequently an encryption key is generated by the server at the first location and the key is linked to the secure user account;
the key is then used to encrypt the data to be protected and the resulting encrypted data is stored during an encrypted window period on the client device of the user at the second location; the server then deleting all of the data and the encrypted data on the server;
the new encryption key remaining stored only on the server;
and for a second use of the method, executing the following steps:
the user starts a secure connection and the server then establishes a secure connection using the secure user account;
during the course of second use the server at the first location presents the user with a form to collect the encrypted data that the user has opted to encrypt and securely store on their client device at the second location in the past;
the user is then given the option and chooses to use the encrypted data already stored on the client device at the second location;
the server at the first location retrieves the encrypted data from the client device at the second location;
the server then retrieves the encryption key from the associated secure user account and the data is decrypted on the server to memory and made available to the user and the data is processed as needed;
after use of the data by the user subsequently the server generates a new encryption key which is used to re-encrypt the data so that it can be stored again on the client device at the second location;
the new encryption key is then stored with the secure user account on the server at the first location in the anticipation of future decryption and use;
the server then deleting all of the data and the encrypted data on the server; the new encryption key remaining stored only on the server during the encrypted window period and referenced against the user name account; and
wherein the client device is programmed to execute a Web enabled application which has a storage capability; and
wherein the encrypted data element is stored on the client device utilising the storage capability of the Web enabled application; and
wherein the Web enabled application is a Web browser; and
wherein the web browser executes HTML 5 including the HTML 5 local storage function whereby the encrypted data is stored in the HTML 5 local storage on the client device for the duration of the encrypted window period which is terminated when the user is given the option and chooses to use the encrypted data already stored on the client device at the second location for the purpose of unencrypting by the server the encrypted data.

2. The method of claim 1 wherein the data is generated at the second location.

3. The method of claim 1 wherein in the second use the data is used on the client device at the second location.

4. The method of claim 1 wherein the client device stores the encrypted data in local storage of a browser or web enabled applications for future retrieval.

5. The method of claim 1 wherein the first location is constituted as a web enabled server.

6. The method of claim 1 wherein the step of encryption of the data after use is performed including the step of generating a new encryption key.

7. The method of claim 1 wherein the data is amended during use.

8. The method of claim 1 wherein an encryption key for the encrypted data is generated at the first location and stored at the first location or within its network environment.

9. The method of claim 8 wherein the first location is constituted by a server device and the key is stored on the server device or within its network environment.

10. A method of isolation from its decryption key of encrypted data stored on a client device; said method comprising
A method of isolation from its encryption key of encrypted data stored on a client device; the improvement comprising storing the encryption key referenced against a username account/user login-data for the client device on a separate device; retrieving the data by transferring the encrypted data to the separate device and upon authentication of the user login/username account decrypting the encrypted data using the encryption key for use of the decrypted data during an unencrypted window period; at the end of the unencrypted window period the separate device re-encrypting the data with a new encryption key to form re-encrypted data; storing the re-encrypted data on the client device;

then deleting all of the data and the encrypted data on the separate device thereby terminating the unencrypted window period; the encryption key remaining stored only on the separate device; and wherein the client device is programmed to execute a Web enabled application which has a storage capability; and wherein the encrypted data element is stored on the client device utilizing the storage capability of the Web enabled application; and wherein the Web enabled application is a Web browser; and wherein the web browser executes HTML 5 including the HTML 5 local storage function whereby the encrypted data is stored in the HTML 5 local storage on the client device for the duration of an encrypted window period which is terminated when the user is given the option and chooses to use the encrypted data already stored on the client device for the purpose of unencrypting by a server the encrypted data.

11. The method of claim 10, wherein the separate device is a Web server.

12. The method of claim 10, wherein in a client server environment during a secured non-use window data is stored securely on the client device as encrypted data requiring decryption by decrypting the encrypted data and wherein the encryption key is not stored on the client device.

* * * * *